United States Patent [19]

Maul et al.

[11] Patent Number: 4,722,187
[45] Date of Patent: Feb. 2, 1988

[54] SPEED REGULATION DEVICE FOR A HYDROSTATIC DRIVE UNIT

[75] Inventors: Mathias Maul, Elchingen; Wilhelm Appel, Ulm-Donaustetten, both of Fed. Rep. of Germany

[73] Assignee: Hydromatik GmbH, Elchingen, Fed. Rep. of Germany

[21] Appl. No.: 741,638

[22] Filed: Jun. 5, 1985

[30] Foreign Application Priority Data

Jun. 13, 1984 [DE] Fed. Rep. of Germany ....... 3421958

[51] Int. Cl.$^4$ .............................................. F16D 31/02
[52] U.S. Cl. ........................................ 60/433; 60/444; 60/445
[58] Field of Search ................. 60/450, 451, 452, 494, 60/447, 465, 443–445, 433; 137/625.23; 417/416, 418

[56] References Cited

U.S. PATENT DOCUMENTS

| | | | |
|---|---|---|---|
| 2,814,309 | 11/1957 | Koenig, Jr. ..................... | 137/625.23 |
| 3,168,295 | 2/1965 | Dorrell et al. . | |
| 3,173,258 | 3/1965 | Hare et al. . | |
| 3,214,911 | 11/1965 | Kempson ............................. | 60/450 |
| 3,246,471 | 4/1966 | Goodale . | |

FOREIGN PATENT DOCUMENTS

| | | |
|---|---|---|
| 1425821 | 7/1970 | Fed. Rep. of Germany . |
| 53-176 | 4/1977 | Japan ..................................... 60/452 |
| 2087521 | 5/1982 | United Kingdom ................. 60/452 |

*Primary Examiner*—William E. Tapolcai
*Attorney, Agent, or Firm*—Scully, Scott, Murphy and Presser

[57] ABSTRACT

The invention relates to a speed regulating device for a hydrostatic drive unit comprising a pump of variable feed volume and a motor in a hydraulic circuit, wherein the pump is driven by a drive motor of variable speed, and there is provided a regulating valve which controls the loading of a hydraulic adjustment device on the pump in dependence on the pressure differential in front of and behind an adjustable throttle arranged in the hydraulic circuit, in such a way that the feed volume is changed in inverse proportion to a speed change in the drive motor. It is the aim of the invention to produce a simple construction for the speed regulating device which can also be easily controlled in reverse operation and can be easily operated. This is achieved by the fact that the hydraulic circuit is a closed circuit, the pump and the hydraulic motor are set-up for operation in both feed directions, the throttle can be adjusted out of a central zero position or a position of minimum feed volume in two opposite directions at maximum feed volume, and the adjustment movement of the throttle is mechanically coupled to the adjustment movement of a directional control valve which produces the hydraulic connection of the relevant working space of the adjustment device with a pressure line.

8 Claims, 1 Drawing Figure

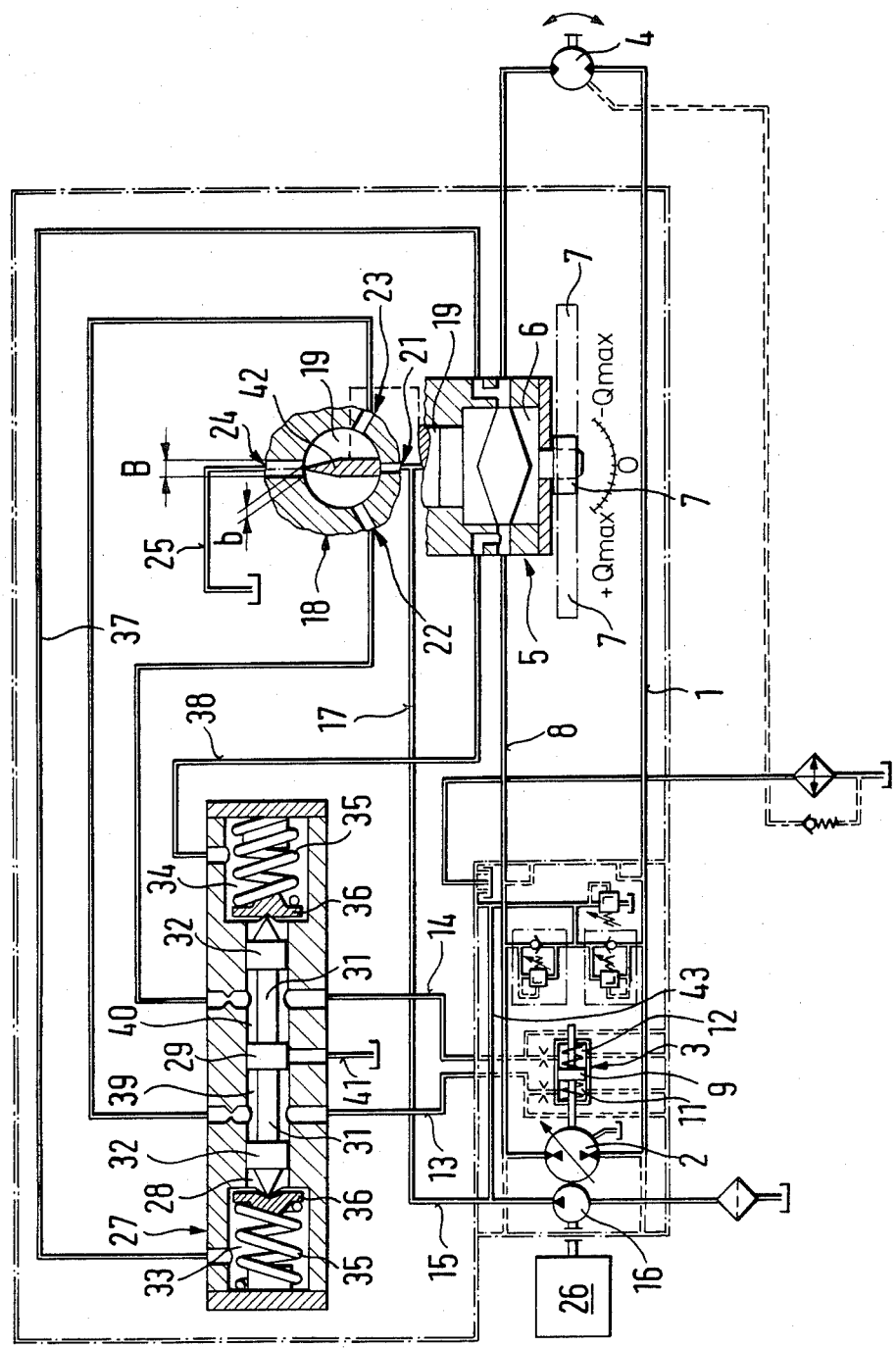

SPEED REGULATION DEVICE FOR A HYDROSTATIC DRIVE UNIT

TECHNICAL FIELD OF THE INVENTION

The invention relates to a speed regulating device for a hydrostatic drive unit, comprising a pump of variable feed volume and a hydraulic motor in a hydraulic circuit. The pump is driven by a drive motor of variable speed and a regulating valve is provided which controls the loading of a hydraulic adjustment device on the pump in dependence on the differential pressure in front of and behind an adjustable throttle arranged in the hydraulic circuit, in such a way that the feed volume is changed in inverse proportion to the speed change of the drive motor.

BRIEF DESCRIPTION OF THE PRIOR ART

Speed regulating devices of this type have been introduced in practice and are therefore known. In the case of a hydrostatic drive unit which is driven by a drive motor of variable speed, their basic purpose is to achieve a constant velocity of flow in the hydraulic circuit or a constant speed in the hydraulic motor in spite of the variable speed of the drive motor.

OBJECT OF THE INVENTION

The object of the invention is to produce a speed regulating device of the present construction which has a simple assembly and can also be easily controlled in reverse operation and can be easily operated.

SUMMARY OF THE INVENTION

This object is achieved by the features of claim 1.

With the embodiment of the invention, the hydraulic circuit is a closed circuit so that forces can be transmitted or torques can be produced in both flow directions. The pump and the motor are set up for operation in both feed directions, so as to be able also to fulfill this requirement. Thus there is arranged an adjustable throttle with two regulating areas independent of each other with a common zero position, from which the throttle can be adjusted to maximum supply volume in both directions of rotation. To reverse the direction of rotation there is provided a directional control valve, the adjustment movement of which is mechanically coupled to the adjustment movement of the throttle. Consequently, in order to operate the drive unit all that is required is the adjustment of a control element, viz. a control element of the type such that it is attached either to the slide of the adjustable throttle or to the slide of the directional control valve. The throttle and the directional control valve are thus operable by a one-hand operation.

From DE-AS No. 12 54 028 a one-hand operation is certainly already known, by means of which an adjustable throttle and a directional control valve, coupled to this by a mechanical linkage, are used for the purpose of setting a desired speed and the direction of rotation of a hydrostatic drive unit, but this type of construction has an open circuit and it is not suitable to be connected to drive motors of variable speed when the speed of the drive unit is to remain approximately constant even with different speeds of the drive motor.

In the present invention, there is a throttle regulation with regulation tolerances known per se, which are particularly noticeable when there is a temperature change in the hydraulic medium. The construction of the invention is therefore suitable for drive purposes, with which not only simplicity and robustness are required, but also with which a change of speed in the case of high drive load is possible. The construction of the invention is therefore particularly suitable for the driving of movable mixers.

The constructions according to claims 2 and 3 are therefore particularly well suited for developing the invention, because actuation by means of a pivoted lever is made possible and for ergonomic reasons this is to be preferred. Thus it is also advantageous if the directional control valve is a rotary slide valve. A simple mechanical coupling can therefore be effected.

Mechanical coupling by means of a separate component can be omitted if the rotary slide valve for the throttle and the directional control valve according to claim 4 is made in one-piece. It is therefore recommended to construct the rotary slide valve for the directional control valve on an axial extension of the rotary slide valve for the throttle in order to obtain sufficient space for hydraulic connections radially of the respective rotary slide valve section. These are necessary in the region of the rotary slide valve for the throttle to draw-off differential pressures, and in the region of the rotary slide valve for the directional control valve for the hydraulic lines to be controlled.

The construction according to claim 6 includes a simple solution which fulfills the requirements in their entirety, and in this construction, in the idling position, both working spaces of the adjustment device are connected in pressureless manner because of a connection to a return flow line. This connection is also utilised for the working space which is not acted upon with connection of the optional swept volume.

The embodiments according to claim 7 also lead to a simple and inexpensively produced and compact construction.

The embodiment according to claim 8 leads to a pressure supply of the adjustment device for the pump which is independent of the different pressures which can occur in the main circuit according to the direction of rotation of the gearing unit. For example, when adjusting the throttle to minimum feed volume there is only a very low pressure behind the throttle. Through the arrangement of the auxiliary circuit of the invention, difficulties arising from this are avoided.

DETAILED DESCRIPTION OF A PREFERRED EMBODIMENT OF THE INVENTION

An embodiment of the invention will be described below with respect to a simplified drawing.

The hydrostatic drive unit shown comprises a closed circuit 1, in which are arranged a pump 2 of variable feed volume with an adjustment device 3, a hydraulic motor 4 and an adjustable throttle 5. The pump 2 and the motor 4 are set-up for operation in both directions of rotation. The throttle 5 is formed by a rotary slide valve 6 which can be rotated by means of an adjustment lever 7 round its longitudinal axis, whereby the cross section of the main line 8 can be closed in a middle zero position and can be adjusted to maximum feed volume from this zero position in both directions of rotation. In the drawing, the two V-shaped lines represented on the inside of the rotary slide valve are intended to represent a variable flow cross-section through the valve in either direction. The throughflow amount in the main line, and hence the speed of the motor 4, can be controlled by means of the adjustable throttle 5. The adjustment lever 7 can be manually adjusted, or a pull of a cable (not shown) can engage with it also.

The adjustment device 3 is formed by a hydraulic cylinder with a double piston 9, the working spaces of which are referenced 11 and 12. The hydraulic lines 13, 14 leading to the working spaces 11, 12 are a part of an auxiliary circuit generally referenced 15, in which there is arranged a pump 16 of constant feed volume which is set for operation in one direction of rotation only.

In order, for the respectively desired direction of rotation of the motor 4, to be able to connect the therewith associated working space 11, 12 of the adjustment device 3 to the feed line 17 of the auxiliary circuit 15, there is provided a directional control valve 18 in the form of a second rotary slide valve 19', which is constructed on an axial extension of the rotary slide valve 6, and the shaft 19' is illustrated at a 90° shifted position from the shaft 19. Therefore, rotation of adjustment lever 7 controls and rotates both valves 5 and 18. The directional control valve 18 is set-up for three switching positions and has four connections. The feed line 17 is connected to the one referenced 21. Lines 13, 14 leading to the adjustment device 3 lead from the connections referenced 22 and 23. Connected to the connection 24 opposite the connection 21 is a return flow line 25 leading to the tank. The rotary slide valve 19 is shown in partial longitudinal section and in cross section.

The pump 2 and the pump 16 are driven by a common drive motor 26 of variable speed. In order to obtain an approximately constant speed of the motor 4, even with variable speeds of the drive motor 26, there is arranged a regulating valve generally referenced 27, which controls the adjustment of the adjustment device 3 in such a way that the feed volume is inversely proportional to the speed change of the drive motor 26.

The regulating valve 27 comprises a valve housing with a bore 28 for receiving a regulating piston 29, from both sides of which extend tapered piston shafts 31 with guide shoulders 32. On both sides of the regulating piston 29 there are arranged working spaces 33, 34 in which are located compression springs 35 which work by means of pressure pieces 36 against the pointed ends of the regulating piston 29. The regulating piston 29 is therefore centrally aligned. The working spaces 33, 34 are connected to the main line 8 in front of and behind the throttle 5 by means of hydraulic lines 37, 38. The lines 13, 14 cross the regulating valve 27 in the area of the hollow spaces 39, 40 located round the piston shafts 31. Because of the pressure differential at the throttle 5 the regulating piston 29 is pushed towards the working space 33 or 34 in which the lower pressure is respectively found. In its off-centre position the regulating piston 29 opens a return flow line 41 leading back to the tank, whereby the pressure in the respective line 13, 14 is relieved. In this way the pump 2 is adjusted to be inversely proportional to a speed change in the drive motor 26, so that the speed of the motor 4 remains approximately constant in spite of a change in the speed of the drive motor 26.

Control of the drive unit is effected by pivoting of the adjustment lever 7 out of the zero position referenced O, into either one or the other direction. Associated with each adjustment direction is an adjustment range of the throttle 5 between zero and a maxiumum feed volume. Simultaneously with the adjustment into one or the other direction, the directional control valve 18 is actuated, and this connects, to the supply line 17, the connection of the working space 11 or 12 in the adjustment device 3 associated with the respective direction of rotation. The switching element on the rotary slide valve 19 is a web 42 formed by lateral flats and this web closes the connection 21 of the supply line 17 in the idling position shown. The working spaces 33, 34 are therefore relieved of pressure. This is possible because the web 42 on its side facing the connection 24 is dimensioned to be narrower (b) than the connection 24 (B). In one of the lateral pivoting positions of the rotary slide valves 6, 19, the supply line 17 is connected to one of the two lines 13, 14, whilst the respective other line 13, 14 is connected to the return flow line 25.

43 designates a feed line which extends between the main- and the auxiliary circuit (8, 15).

The above-described hydrostatic gearing unit is provided for the drive of the mixing drum of a mobile mixer (not shown), e.g. for concrete. The mixing drum is connected for driving to the motor 4. The drive motor 26 is the internal combustion engine of the transport vehicle.

What is claimed is:

1. In a speed regulating device for a hydrostatic drive unit, comprising a pump which can be driven by a drive motor of variable speed and whose feed volume can be varied by means of a hydraulic adjustment device, and a motor which is set for operation in both feed directions, to be driven by the pump which is coupled to the motor through a hydraulic circuit, wherein a regulating valve is provided which controls the loading of the hydraulic adjustment device on the pump in dependence on the differential pressure in front of and behind an adjustable throttle arranged in the hydraulic circuit, such that the feed volume is changed in inverse proportion to the speed change of the drive motor, and wherein the adjustment movement of the throttle is mechanically coupled to the adjustment movement of a directional control valve which controls the feed direction of the motor, the improvement comprising, the hydraulic circuit comprises a closed circuit (1), the pump (2) is operable in both feed directions, the throttle (5) is adjustable out of a center zero position (0) or a position of minimum feed volume in two opposite direction at maximum feed volume (QM), and the directional control valve (18) produces the hydraulic connection of hydraulic pressure chambers (11), (12) on opposite sides of a control piston of the adjustment device (3) with a pressure line (17).

2. A speed regulating device according to claim 1, characterised in that the adjustable throttle is formed from a rotary slide valve.

3. A speed regulating device according to claim 2, characterised in that the directional control valve is a rotary slide valve.

4. A speed regulating device according to claim 3, characterised in that the rotary slide valve for the throttle, and the rotary slide valve for the directional control valve are made in one piece.

5. A speed regulating device according to claim 4, characterised in that the rotary slide valve for the directional control valve is constructed on an axial extension of the rotary slide valve for the throttle.

6. A speed regulating device according to claim 5, characterised in that the directional control valve is a 4/3 directional control valve, in that the rotary slide valve has a web formed by flats, and this web is able to close four radially or axially arranged lines in the valve housing, of which lines a pressure-carrying line and a return flow line are opposite each other, and two lines leading to the working spaces of the adjustment device are arranged on both sides of the pressure-carrying line offset in the circumferential direction, whereby the web is dimensioned, on its side facing the return line, to be narrower (b) than the return line (B).

7. A speed regulating device according to claim 6, characterised in that the regulating valve has a regulating piston, centrally aligned by means of springs, with piston shafts arranged on both sides of the regulating piston, wherein said piston co-operates with control edges of a common return line, and in the region of the piston shafts there is respectively arranged a passage for the lines leading from the directional control valve to the adjustment device.

8. A speed regulating device according to claim 7, characterised in that the directional control valve is arranged in an auxiliary circuit with a pump of constant feed volume and only one feed direction, whereby both pumps are in drive-connection with a common drive motor.

* * * * *